July 7, 1964

S. M. TERRY ET AL 3,140,413

INDUCTOR ALTERNATOR

Filed Feb. 10, 1961

INVENTORS
STANLEY M. TERRY
BOB O. BURSON

BY

*Teller & McCormick*

ATTORNEYS

July 7, 1964

S. M. TERRY ET AL 3,140,413

INDUCTOR ALTERNATOR

Filed Feb. 10, 1961

3,140,413
Patented July 7, 1964

3,140,413
INDUCTOR ALTERNATOR
Stanley M. Terry and Bob O. Burson, Longmeadow, Mass., assignors, by mesne assignments, to R. E. Phelon Company, Inc., East Longmeadow, Mass., a corporation of Massachusetts
Filed Feb. 10, 1961, Ser. No. 88,558
13 Claims. (Cl. 310—168)

This invention relates to dynamo electric machines, and deals more particularly with electric generators or alternators of the inductor type wherein the field and armature windings are fixed relative to one another and changes in flux necessary to provide an E.M.F. are produced by a rotating mass of magnetic material.

A general object of this invention is to provide an electric generating device particularly adapted for use as an auxiliary power unit for an internal combustion engine, and wherein part of the device serves as a flywheel for the engine.

Another object of the invention is to provide an electric generating device of the type mentioned in the last paragraph which device is of a simple construction that fits into the space normally occupied by the flywheel, which produces a three phase or other polyphase output at high efficiency, and which includes a wound field whereby the output voltage may be fully controlled by the simple expedient of regulating the field excitation.

Another object of this invention is to provide an electric generating device of three phase or other polyphase construction in which the stator and rotor teeth or poles and the field and armature coils are so arranged and proportioned that the flux in the main supporting magnetic portions of the machine is substantially constant at all speeds and loads, permitting the use of nonlaminated magnetic stator core and rotor materials and greatly contributing to quiet operation, high efficiency and simple low cost construction.

Another object of this invention is to provide an electric generating device having no moving contacts, such as slip rings or commutators, and which, if desired, may be easily and economically waterproofed to protect the same against the effects of water and other deleterious atmospheres.

Another object of this invention is to provide an inductor alternator having a stator adapted to be connected directly to an engine block or other stationary engine structure and a flywheel rotor adapted for connection to a shaft of the engine, thereby simplifying the construction of the alternator and reducing the number of parts required.

A still further object of this invention is to provide an inductor alternator having an improved arrangement and design of the magnetic or flux-carrying material, and an improved manner and means for mounting the field and armature coils thereon, with the result that leakage, iron, air gap and other losses are minimized for high efficiency.

Other objects and advantages of the invention will be apparent from the description and claims which follow and from the drawings forming a part of this specification.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
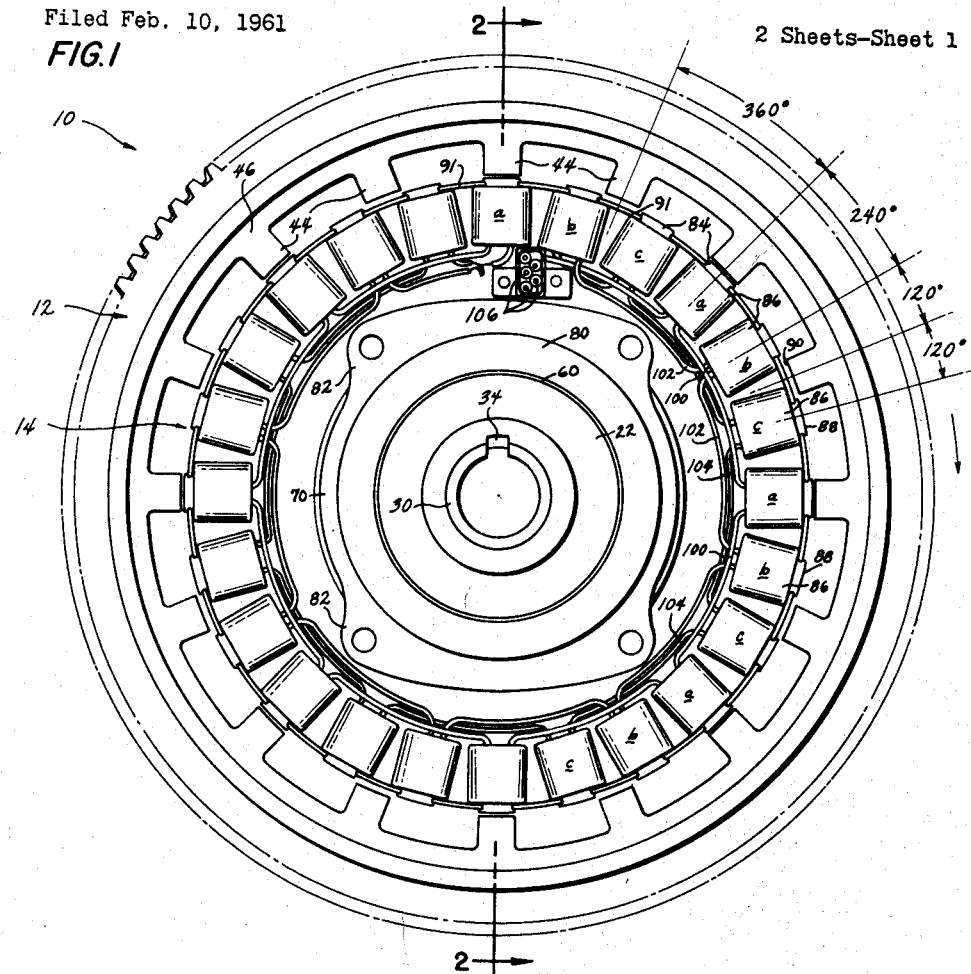
FIG. 1 is an elevational view of an alternator embodying this invention, the view being taken looking toward the open end of the flywheel rotor.
Figure 2:
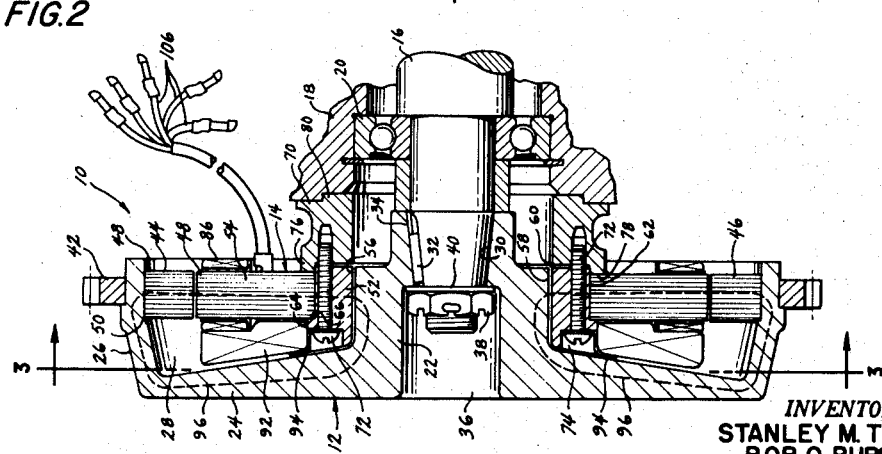
FIG. 2 is a slightly reduced sectional view taken on the line 2—2 of FIG. 1, the view showing the alternator connected with an engine shaft and engine block or other stationary structure, which latter parts serve to support respectively the rotor and stator of the alternator.
Figure 3:
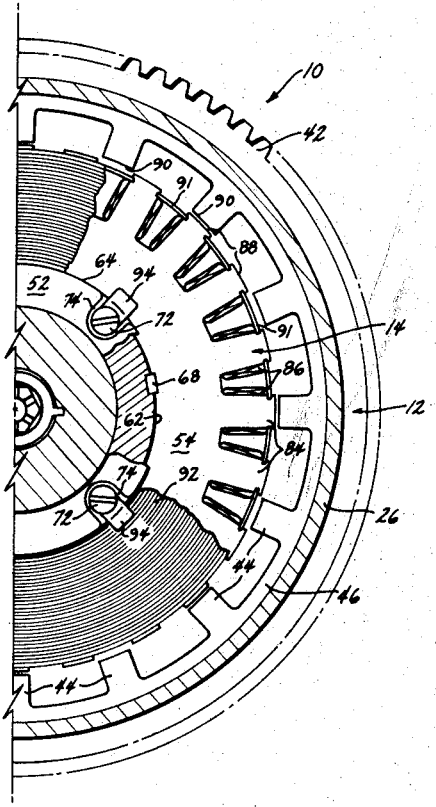
FIG. 3 is a half sectional view taken on the line 3—3 of FIG. 2 with certain parts being broken away to reveal the structure of other parts and with the armature coils being shown schematically.

In the drawings, wherein is shown the preferred embodiments of this invention, and first referring to FIGS. 1, 2 and 3, the reference numeral 10 indicates in general a complete inductor alternator made in accordance with this invention. The alternator 10 basically comprises a rotor 12 which is in the form of a flywheel and adapted for attachment to an engine shaft or the like and a stator 14 which is adapted for attachment to the stationary structure of the engine in concentric relation to the rotor carrying shaft. As an example of how the alternator may be mounted to an engine, FIG. 2 shows the rotor 12 attached to a shaft 16 and the stator 14 attached to a stationary structure 18. The stationary structure may be part of the engine block and the shaft 16 a shaft driven from the crankshaft of the engine and supported for rotation relative to the stationary structure 18 by means of a ball bearing unit 20, as shown. Rotation of the shaft 16 accordingly causes rotation of the rotor 12 relative to the stator 14.

Associated with the stator is a means for establishing a magnetic field passing through the various parts of the alternator and a number of armature coils arranged to have electrical currents induced therein as a result of changes in the magnetic flux linked therewith. These changes in the magnetic flux, necessary to induce the currents in the armature coils, are in turn produced by means on the rotor which cooperate with the stator to vary the reluctance of the flux paths through the armature coils. The construction and arrangement of the cooperating rotor and stator parts and the electrical interconnection of the various armature coils is such that a three-phase or other polyphase output is provided. This output may in turn be used directly as a power source for various auxiliary equipment associated with the engine or may be rectified for battery charging purposes and the like.

As mentioned, the rotor 12 is in the form of a flywheel. Referring to FIG. 2, it will be observed that the illustrated rotor includes a generally axially extending hub 22, a radially extending web 24 and a rim 26 which extends axially of the web 24 in the same direction as the hub 22. The hub, web and rim therefore define an annular recess 28 which receives the stator 14. Preferably, and as shown, the hub, web and rim comprise a single integral unit which may be made by a casting or forging process. The unit is made of a suitable magnetic material, such as iron or steel, capable of providing a low reluctance path for the flux produced by the stator, one of the features of this invention, as hereinafter described, being that the rotor rim, web and hub constitute a part of the flux circuit.

Although various different means for attaching the rotor 12 to the shaft 16 may be employed without departing from the invention, the hub 22 of the illustrated rotor is provided with a tapered bore 30 at its right-hand end, as viewed in FIG. 2, which bore receives a correspondingly tapered portion of the shaft 16. The hub is angularly fixed to the shaft by a key 32 which fits in a key slot 34 of the hub and a corresponding slot in the shaft, as shown in FIG. 2. To the left of the tapered bore 30 the hub 22 is provided with an enlarged bore 36 which receives the threaded end of the shaft 16 and a nut 38 and washer 40 for axially fixing the rotor to the shaft, as shown. Also, as shown in FIGS. 1, 2 and 3, the rim 26 of the rotor has fixed thereto, as by press fitting, an annular gear 42 which surrounds the rotor and serves, for example, to mesh with the pinion of a starter motor or other device. The gear 42, however, is not essential to this invention and may be omitted if desired. At this point, it should also be noted that the rotor 12, due to the arrangement of its parts, has a relatively high moment of inertia about the axis of the shaft 16 so that apart from its flux-varying function in connection with the stator 14 it will also have a flywheel effect on the shaft 16 and may therefore be used to replace the flywheel conventionally used with the engine. It will also be noted that the construction of the rotor and stator is such that they both occupy a relatively small amount of space. In fact, their size is such that they take up little more, if any, space than taken by a conventional flywheel.

For the purpose of producing a variation in the reluctance of the flux paths linking the armature coils of the stator, the rotor rim 26 includes a plurality of angularly spaced poles or teeth 44, 44 arranged in circular alignment and extending inwardly from the body of the rim. In order to reduce hysteresis and eddy current losses which occur as the result of a varying flux in the poles 44, 44, these poles are preferably provided by a separate annulus 46 made from several laminations of sheet material and press fitted to the body of the rim, as shown best in FIG. 2. To receive the annulus 46, the inner surface of the rim 26 is machined to provide a cylindrical surface 48 which terminates inwardly of the rim in a shoulder 50. In assembling the annulus with the shoulder of the rim, the annulus is pressed into the rim until the inner or left-hand face of the annulus engages the shoulder 50, as shown in FIG. 2.

The structure of the stator 14 is best shown in FIGS. 2 and 3. Referring to these figures, it will be observed that the stator includes an inner annular member 52 and an outer annular member 54. Both of these members are made from a magnetic material and constitute part of a low reluctance flux path for the magnetic field established in the alternator. The inner member 52 is preferably of a solid construction and is provided with a cylindrical bore 56 which receives a portion of the rotor hub 22 having a corresponding outer cylindrical surface 58. The bore 56 is adapted to be arranged concentrically with the rotor hub surface 58 and is of such a diameter relative to the diameter of the surface 58 as to provide a relatively thin air gap 60 between the bore 56 and the surface 58.

The outer surface of the inner stator member 54 is divided into a first axial portion which receives and supports the outer member 54 and a second axial portion which receives and supports the field coil hereinafter described. The first axial portion is preferably provided with a cylindrical surface 62 and the second axial portion with a cylindrical surface 64, the surface 64 being of larger diameter than the surface 62 and separated from the latter by a radial shoulder 66. As shown, the outer stator member is preferably of laminated construction and is provided with a cylindrical center bore which mates with the surface 62 of the inner member 52. As shown in FIG. 3, the outer stator member 54 is angularly fixed to the inner stator member 52 by suitable means such as a key 68. However, other suitable means for angularly fixing the outer member to the inner member could be employed, and the two members could be joined by press fitting, without departing from the invention.

For the purpose of holding the outer stator member 54 axially in place on the inner stator member 52, and also to provide a means for mounting the stator to the stationary engine structure 18, the stator has associated therewith a mounting ring 70. As shown in FIG. 2, the mounting ring 70 is concentric with the axis of the stator and rotor and is connected to the stator by a plurality of screws 72, 72 which extend axially through the inner stator member 52 and are threadably received by the mounting ring. The heads of the screws 72, 72 are received in recesses 74, 74 formed in the left-hand face of the inner stator member 52. At its inner or left-hand end the mounting ring 70 is rabbeted to provide a recess for receiving the right-hand end of the inner stator member 52 and to provide an annular rib 76 which surrounds the associated end of the member 52, the latter rib having an annular abutment surface 78 which engages the outer lateral surface of the outer stator member 54. The outer stator member 54 is therefore clamped axially in place on the inner stator member by engagement with the shoulder 66 at its inner face and engagement with the abutment surface 78 at its outer face. At its right-hand end the mounting ring 70 is machined to provide an annular rib 80 which fits within a corresponding annular recess of the stationary engine structure 18 to locate the mounting ring and stator 14 in concentric relationship with the axis of the shaft 16. The mounting ring is adapted to be fixed to the engine structure 18 by a plurality of apertured ears 82, 82 which extend outwardly from the body thereof to receive bolts or other devices for fastening the same to the engine structure. The mounting ring 70 does not constitute any part of the flux path and is preferably made from a non-magnetic material, such as aluminum, to prevent the leakage of magnetic flux to the engine structure.

As shown best in FIGS. 1 and 3, the outer stator member 54 includes a plurality of radially outwardly extending teeth or poles 84, 84, each of which receives and is surrounded by an armature coil 86. The stator poles 84, 84 are arranged in angularly spaced circular alignment and have outer end faces 88, 88 which are closely radially spaced to the inner end faces 90, 90 of the rotor poles 44, 44 when the rotor poles are brought into angular alignment therewith by rotation of the rotor. Thus, when a rotor pole is aligned with a corresponding stator pole, a relatively thin air gap will exist therebetween. The armature coils may be secured to the associated stator poles 84, 84 by various suitable means, but in the preferred and illustrated case they are held in place by a plurality of retaining elements 91, 91. The elements 91, 91 are substantially flat pieces or strips of nonmagnetic material each of which bridges the space between an associated pair of adjacent stator poles and has its circumferentially opposite edges received in grooves in the sides of the stator poles, as shown. The retaining elements themselves are preferably held in place frictionally by a press fit between each element and its associated poles, although they may also be held in place by a suitable cement.

Preferably, and as shown, the rotor pole end faces 90, 90 are of substantially the same circumferential length as the stator pole end faces 88, 88. Assuming, as is the case, that magnetic flux flows from the stator to the rotor, it will be obvious from FIG. 3 that as the rotor rotates, the poles 84, 84 of the stator will be alternately brought into and out of alignment with the rotor poles 44, 44. When a particular stator pole 84 is fully angularly aligned with one of the stator poles 44, 44, the flux path through that pole will have a minimum reluctance and the total flux passing therethrough will be at a maximum value. Similarly, when the stator tooth is located midway between two adjacent rotor poles the reluctance of the flux path through the pole will be relatively high and the total flux through the tooth will be at a minimum value approaching zero. Between these two positions of the stator pole relative to the rotor poles the reluctance of the flux path and the total flux passing through the stator pole will be at intermediate values. Accordingly, rotation of the rotor varies the flux passing through the various stator poles 84, 84 so that the armature coils 86, 86 surrounding these poles will have electrical currents or E.M.F.'s induced therein.

The means for establishing a magnetic flux or field in the alternator comprises an annular field coil 92 which is adapted to be excited by a D.C. current. The excitation for the coil may be provided by a separate external source or may be provided by the output from the generating coils after the latter is rectified. In the illustrated case, the coil 92 is shown as a single coil and may be wound, in the case of self-excitation, for either series or parallel connection with the load. Although not illustrated, it is also contemplated that the coil could be wound as two separate parts or coils to provide for a compound connection with one part or coil connected in series with the load and the other part or coil connected in parallel. The illustrated field coil 92 surrounds the inner stator member 52 and is located between the left-hand face of the outer stator member 54 and the web 24 of the rotor, as shown in FIG. 2. The coil has a center opening which is supportingly received by the cylindrical surface 64 of the inner stator member, and the coil is held axially in place on the latter member by means of a plurality of retaining elements or clips 94, 94 which are fastened to the stator by the screws 72, 72 and engage the left-hand surface of coil, as shown in FIG. 2, to hold the coil against the outer stator member 54. The coil 92 is preferably relatively flat in the radial direction and extends substantially to the outer ends of the stator poles 84, 84.

When excited, the field coil 92 establishes in the alternator a generally toroidal magnetic flux field, the toroid axis of which is generally coincident with the common axis of the rotor and stator. Referring to FIG. 2, the broken lines indicated at 96, 96 illustrate the path followed by the magnetic flux in flowing between the stator 14 and the rotor 12. Assuming that the flux flows in such a direction as to pass from the stator poles 84, 84 to the rotor poles 44, 44, and starting from a stator pole 84, the flux travels from the pole 84 across an air gap to a rotor pole 44. From the pole 44 it travels axially along the rotor rim 26 and then radially inwardly through the rotor web 24 to the rotor hub 22. It then crosses the air gap 60 and enters the inner stator member 52 from which it travels to the body of the outer stator member 54 and back to the stator pole 84. It will be observed that this arrangement of the flux carrying material is such that the flux path closely surrounds the field coil 92. As a result, the total reluctance of the flux path and the leakage of flux is reduced. The reluctance of the flux path is also further reduced by the design of the air gap 60 which may be made relatively thin due to the coaxial arrangement of its opposing surfaces. It should also be noted that the flux variations are confined in general to the stator poles 84, 84 and the rotor poles 44, 44 and that in the remainder of the flux path the flux is unidirectional and of a substantially constant value. That is, substantially no variation of the magnetic flux occurs in the rim 26, web 24 and hub 22. Also, little flux variation occurs in the inner stator member 52 and that portion of the outer member 54 located radially inwardly from the poles 84, 84. Therefore, hysteresis and eddy current losses in these parts of the alternator are substantially eliminated, thereby permitting these parts to be of solid or nonlaminated construction. This also greatly reduces the hum or iron noise since the noise-producing flux variations occur only in the poles which in turn constitute only a small portion of the total flux path, thereby contributing to quiet operation. Furthermore, the flux variations which do occur in the rotor and stator poles do not have any substantial effect on the flux linking the field coil 92, and therefore little or no induced voltage is set up in the field coil. Such an induced voltage, if present, would tend to oppose the applied field voltage and would mean that a higher voltage would have to be applied to maintain the field ampere turns at the desired level.

As mentioned previously, the alternator 10 is designed to provide a polyphase output. To achieve this end, the rotor and stator poles are so relatively arranged that as one group of stator poles is brought into alignment with corresponding rotor poles, other groups of stator poles will be in different positions of alignment with other rotor poles. Thus, the currents and voltages generated in the armature coils of one group of stator poles will be out of phase with the currents and voltages generated in the armature coils of the other groups of stator poles. For example, in the illustrated alternator the rotor and stator poles are arranged to provide a three-phase output. The stator poles 84, 84 and the associated armature coils 86, 86 are divided into three separate groups, and their relationship with the rotor poles is such that when the poles comprising one of said groups are brought into full angular alignment with corresponding rotor poles 44, 44 the poles comprising one of the other two groups will be spaced by +120 electrical degrees from full alignment with the same or other rotor poles and the poles of the other group will be spaced by −120 electrical degrees from full alignment with the same or other rotor poles. As a result, the currents and voltages induced in the coils of one group will be out of phase by plus and minus 120 degrees respectively with the currents and voltages induced in the coils of the other two groups.

Although various different arrangements of the stator and rotor poles may be employed to produce such a phase relationship between the three groups of stator poles and coils, the preferred arrangement is shown in FIG. 1. From this figure, it will be noted that the rotor poles 44, 44 are equally angularly spaced circumaxially of the rotor rim and that the stator poles 84, 84 are also equally angularly spaced, but by a smaller amount, circumaxially of the outer stator member 54. Assuming the angular spacing between adjacent rotor poles 44, 44 to be equal to 360 electrical degrees, as shown in FIG. 1, the angular spacing between adjacent stator poles 84, 84 is such as to equal 240 electrical degrees. Accordingly, when the stator and rotor are in the relative positions shown in FIG. 1, every third stator pole 84, 84 will be fully aligned with a corresponding rotor pole 44. In FIG. 1, these stator poles and their associated coils are indicated by the letter $a$ and together comprise the first group of poles and coils referred to above. Also, assuming that the rotor 12 is rotated clockwise, as shown by the arrow in FIG. 1, the stator poles and coils indicated by the letter $c$ in FIG. 1, will be in a condition of approaching alignment with other rotor poles 44, 44. At the same time, the coils and poles indicated by the letter $b$ will be in a condition of departing from alignment with the same rotor poles as approached by the poles and coils marked $c$. The poles and coils marked $b$ comprise the second group, and the poles and coils marked $c$ the third group referred to above.

With conditions as shown in FIG. 1, the reluctance of the flux paths through the individual stator poles comprising the group $a$ will be at a minimum value, the reluctance of the flux paths through the stator poles comprising the group $c$ will be decreasing, and the reluctance of the flux paths through the poles comprising the group $b$ will be increasing. Consequently, the flux through each pole of group $a$ will be at its maximum value, the flux through the poles and coils of group $c$ will be increasing, and the flux through the poles and coils of group $b$ will be decreasing. Assuming that the rotation of the rotor causes the flux in each stator pole to vary sinusoidally, as is approximately the case, the voltages induced in the armature coils will also vary sinusoidally with the voltage induced in each coil being 90 degrees out of phase and leading the associated flux. Furthermore, the phase relationships between the voltages generated in the three groups of coils is such that the voltage produced by the coils of group *c* will lag by 120 degrees the voltage produced in the coils of group *a*, and the voltage produced in the coils of group *b* will lead by 120 degrees the voltage produced by the coils of group *a*.

Figure 4:
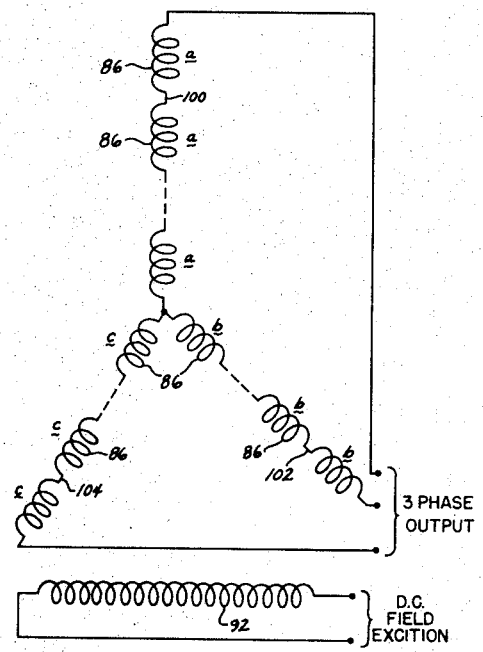
FIG. 4 is a schematic diagram illustrating the manner in which the various coils of the alternator are electrically connected.

As shown in FIG. 1, the coils comprising each of the three groups are preferably electrically interconnected in series, the coils of group *a* being interconnected by leads 100, 100, the coils of group *b* being interconnected by leads 102, 102 and the coils of group *c* being interconnected by leads 104, 104. FIG. 4 shows schematically the electrical interconnection of the coils from which it will be noted that the three groups of series connected coils are connected in the familiar three-phase Y arrangement. Instead of the Y connection, the three groups of series connected coils could also, if desired, be connected in a Δ fashion. The three-phase output is taken from the alternator, and the D.C. field excitation supplied through the leads indicated at 106, 106 in FIGS. 1 and 2. It should also be apparent that the output voltage will be dependent on the strength of the flux field produced by the field coil 92 and that therefore the output voltage may be readily varied by varying the voltage supplied to the field coil.

Figure 5:
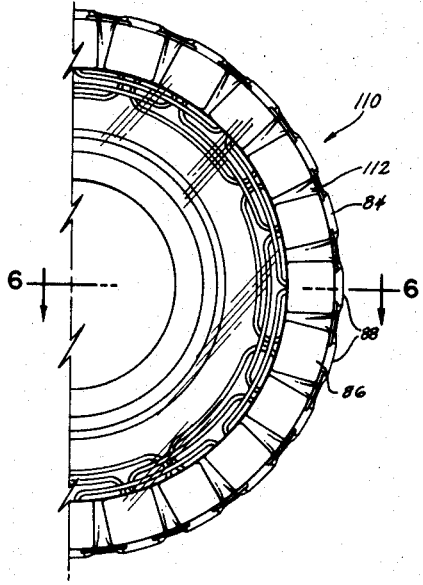
FIG. 5 is a half elevational view of a modified form of stator which may be employed in the alternator of FIG. 1.
Figure 6:
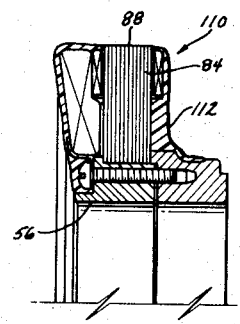
FIG. 6 is a half sectional view taken on the line 6—6 of FIG. 5.

One of the features of this invention is that the above described structure of the alternator may be readily and economically waterproofed to protect the same from water and other atmospheres. FIGS. 5 and 6 show a waterproofed stator which may be employed in the alternator 10 in place of the stator shown in FIGS. 1, 2 and 3. The stator 110 is identical with the stator 14 described above except for the addition of a potting or waterproofing material which surrounds the field coil 92, the armature coils 86, 86 and at least part of the other structure of the stator so as to completely seal the field and armature windings from the surrounding atmosphere. In FIGS. 5 and 6 the potting material is indicated at 112. This material is preferably an epoxy or other suitable material conventionally used for this purpose. The material may be applied to the stator by the use of a mold, in which case the potting material is cast around the various parts of the stator, or may be applied by dipping the stator into a quantity of the potting material. After the casting or dipping process, any material which adheres to the end faces 88, 88 of the poles 84, 84 should be removed to avoid interference with the rotor poles 44, 44. Likewise, any potting material adhering to the bore 56 should be removed to avoid interference with the rotor hub 22. Since the alternator contains no moving contacts, the potting material surrounds all of the current carrying elements so as to provide a more effective degree of waterproofing than is generally obtainable with other electrical generating devices. The rotor 12 might also be provided with a coat of potting material to prevent rust; however, since the rotor contains no current carrying elements, this is not necessary for the complete and effective waterproofing of the device.

The invention claimed is:

1. In an inductor alternator for use with an engine or other device having stationary structure and a shaft journalled in said stationary structure for driven rotation about its longitudinal axis, the combination of:
   a rotor of magnetic material which rotor includes a hub and a rim arranged coaxial with one another and joined by a generally radial web,
   said hub and rim of said rotor extending in the same direction axially of said web to define an annular recess therebetween and said hub being adapted to be fixed to said shaft for rotation therewith,
   a stator comprising inner and outer annular members of magnetic material positioned in said annular recess concentric with said hub,
   said hub having a generally cylindrical outer surface and said inner stator member having a generally cylindrical bore which surrounds and is closely spaced to said hub surface to provide a radially thin air gap between said hub and stator,
   said outer stator member being received on said inner stator member and said inner stator member having a shoulder which engages one lateral face of said outer stator member, and
   a mounting ring of nonmagnetic material connected with said inner stator member and adapted for securement to said stationary structure so as to support said stator therefrom,
   said mounting ring including an abutment that engages the other lateral face of said outer stator member to hold said outer stator member axially in place on said inner stator member.

2. In an inductor alternator for use with an engine or other device having stationary structure and a shaft journaled in said stationary structure for driven rotation about its longitudinal axis, the combination of:
   a rotor of magnetic material which rotor includes a hub and a rim arranged coaxial with one another and joined by a generally radial web,
   said hub and rim of said rotor extending in the same direction axially of said web to define an annular recess therebetween and said hub being adapted to be fixed to said shaft for rotation therewith,
   a stator comprising inner and outer annular members of magnetic material positioned in said annular recess concentric with said hub,
   said inner stator member having a generally cylindrical bore which surrounds and is closely spaced to said latter hub surface to provide a radially thin air gap between said hub and inner stator member and the periphery of said inner stator member including two generally cylindrical surfaces of different diameters separated by a radial shoulder,
   said outer stator member being received on the smaller of said two latter cylindrical surfaces and having one of its lateral faces in engagement with said radial shoulder,
   an annular field coil surrounding the larger of said latter cylindrical surfaces, and
   a mounting ring of nonmagnetic material connected with said inner stator member and adapted for securement to said stationary structure so as to support said stator therefrom,
   said mounting ring including an abutment which abutment engages the other lateral face of said outer stator member and holds said outer member axially in place on said inner member.

3. The combination as defined in claim 6 further characterized by:
   said mounting ring being connected to said inner stator member by a plurality of screws passing axially through said inner stator member and threaded into said mounting ring, and
   a plurality of coil retaining elements carried respectively by said screws,
   said coil retaining elements having portions which engage one side of said field coil and hold the same in place on said inner stator member between the outer stator member and said retaining elements.

4. In an inductor alternator, the combination of:
   an annular stator of magnetic material having on its radially outer portion a plurality of poles defining an annular series of circumferentially spaced end faces,
   a rotor of magnetic material arranged concentrically with said stator and including a radially extending web and a circumferentially continuous rim extending axially in one direction from said web and which rim circumferentially encloses said stator,
   a plurality of poles on the radially inner portion of said rim defining another annular series of circumferentially spaced end faces which are separated from said stator pole end faces by thin air gaps and which pass circumferentially over and into and out of alignment with said latter end faces as said rotor is rotated relative to said stator, an annular field coil arranged concentrically with said stator and located between said stator and said rotor web, a plurality of armature coils located respectively on said stator poles, and cooperating means on said stator and rotor defining a thin air gap between the radially inner portion of said stator and said rotor.

5. In an inductor alternator, the combination defined in claim 4 further characterized by:

said stator pole end faces being of substantially shorter circumferential length than the spaces between adjacent rotor pole end faces so that when a stator pole end face is equally spaced between two rotor pole end faces it is spaced some distance circumferentially from each of said rotor pole end faces.

6. On an inductor alternator, the combination defined in claim 4 further characterized by:

said stator pole end faces and said rotor pole end faces being of substantially equal circumferential length, there being two rotor poles for every three stator poles with the rotor poles being separated by spaces greater than the circumferential length of the stator pole end faces.

7. In an inductor alternator, the combination defined in claim 6 further characterized by:

said armature coils being so interconnected as to provide a three phase voltage output.

8. In an inductor alternator, the combination defined in claim 4 further characterized by:

adjacent ones of said rotor pole end faces being angularly spaced by an angle representing 360 electrical degrees and adjacent ones of said stator pole end faces being spaced by an angle of 240 electrical degrees with the result that as one group of stator pole end faces comprising every third stator pole end face is brought into alignment with corresponding rotor pole end faces two other groups of stator pole end faces will respectively be out of alignment with corresponding rotor poles by plus and minus 120 electrical degrees whereby the voltage generated the armature coils of each group of stator poles will respectively be out of phase by plus and minus 120 electrical degrees with the voltage generated in the armature coils of the other two groups of stator poles, and means electrically connecting in series the armature coils of each group of stator poles to provide a three-phase output.

9. In an inductor alternator, the combination defined in claim 8 further characterized by:

said stator pole and end faces being of substantially shorter circumferential length than the spacing between adjacent rotor pole end faces so that when a stator pole end face is equally spaced between two rotor pole end faces it is spaced some distance circumferentially from each of said rotor pole end faces.

10. In an inductor alternator, the combination of:

an annular stator of magnetic material having on its radially outer portion a plurality of poles defining an annular series of circumferentially spaced end faces, a rotor of solid magnetic material arranged concentrically wtih said stator and including a radially extending web and a circumferentially continuous rim extending axially in one direction from said web and which rim circumferentially encloses said stator, a plurality of laminated rotor poles fixed to the radially inner portion of said rim and defining another annular series of circumferentially spaced end faces which are separated from said stator pole end faces by thin air gaps and which pass circumferentially over and into and out of alignment with said latter end faces as said rotor is rotated relative to said stator, an annular field coil arranged concentrically with said stator and located between said stator and said rotor web, a plurality of armature coils located respectively on said stator poles, and cooperating means on said stator and rotor defining a thin air gap between the radially inner portion of said stator and said rotor.

11. In an inductor alternator, the combination defined in claim 10 further characterized by:

an annular ring of laminated magnetic material fixed to and engaging the radially inner surface of said rim, said ring including said laminated rotor poles.

12. In an inductor alternator for use with an engine or other device having stationary structure and a shaft journaled in said stationary structure for driven rotation about its longitudinal axis, the combination of:

an annular stator of magnetic material having on its radially outer portion a plurality of poles defining an annular series of circumferentially spaced end faces, a rotor of magnetic material arranged concentrically with said stator and including a radially extending web and a circumferentially continuous rim extending axially in one direction from said web and which rim circumferentially encloses said stator, a plurality of poles on the radially inner portion of said rim defining another annular series of circumferentially spaced end faces which are separated from said stator pole end faces by thin air gaps and which pass circumferentially over and into and out of alignment with said latter end faces as said rotor is rotated, an annular field coil arranged concentrically with said stator and located between said stator and said rotor web, a plurality of armature coils located respectively on said stator poles, cooperating means on said stator and rotor defining a thin air gap between the radially inner portion of said stator and said rotor, means on said rotor adapted for fixedly connecting said rotor to said shaft, and a nonmagnetic member attached to said stator and adapted for fixedly connecting said stator to said stationary structure and for magnetically insulating said stator from said structure.

13. The combination defined in claim 12 further characterized by:

a ring gear fixed to said rim.

References Cited in the file of this patent

UNITED STATES PATENTS

| 559,419 | Steinmetz | May 5, 1896 |
| 2,071,953 | Schou | Feb. 23, 1937 |
| 2,618,757 | Weisman | Nov. 18, 1952 |

FOREIGN PATENTS

| 13,404 | Great Britain | Aug. 17, 1895 |

UNITED STATES PATENT OFFICE

CERTIFICATE OF CORRECTION

Patent No. 3,140,413                                               July 7, 1964

Stanley M. Terry et al.

It is hereby certified that error appears in the above numbered patent requiring correction and that the said Letters Patent should read as corrected below.

Column 8, line 49, for the claim reference numeral "6" read -- 2 --; column 9, line 54, strike out "and".

Signed and sealed this 10th day of November 1964.

(SEAL)
Attest:

ERNEST W. SWIDER
Attesting Officer

EDWARD J. BRENNER
Commissioner of Patents